United States Patent [19]

Grossman

[11] Patent Number: 5,299,527
[45] Date of Patent: Apr. 5, 1994

[54] REMOTE CONTROL PACIFIER NOVELTY DEVICE

[76] Inventor: Mark Grossman, 6623 26th St. W., Bradenton, Fla. 34207

[21] Appl. No.: 895,643

[22] Filed: Jun. 9, 1992

[51] Int. Cl.$^5$ .................. G09F 11/30; A63H 33/30
[52] U.S. Cl. .................. 116/323; 116/DIG. 30; 40/491; 446/144; 446/151
[58] Field of Search .............. 116/321, 323, DIG. 30; 40/375, 488, 490, 491; 446/143, 144, 151; 132/73.5, 75, 75.6

[56] References Cited

U.S. PATENT DOCUMENTS

| | | | |
|---|---|---|---|
| 593,528 | 11/1897 | Laue et al. | 40/375 |
| 595,129 | 12/1897 | Neuner | 40/375 |
| 2,222,272 | 11/1940 | Wesner | 40/491 X |
| 3,165,090 | 1/1965 | Smith | 116/DIG. 30 X |
| 3,299,505 | 1/1967 | Pionek | 132/75 |
| 3,477,146 | 11/1969 | Warneke | 40/491 X |
| 4,142,312 | 3/1979 | Stokes | 40/375 X |
| 5,117,847 | 6/1992 | May | 132/73.5 X |

FOREIGN PATENT DOCUMENTS 0862865  3/1941  France ........................ 116/323

*Primary Examiner*—William A. Cuchlinski, Jr.
*Assistant Examiner*—John L. Beres
*Attorney, Agent, or Firm*—Leon Gilden

[57] ABSTRACT

A novelty device to simulate use of a remote control unit is provided with a housing having side walls, a first end wall spaced from a second end wall, and a top wall. A plurality of end wall slots arranged in a parallel relationship are directed through the second end wall, with the top wall having a like number of top wall slots, where each top wall slot includes as associated projection in mechanical relation to a drive link and projection plate, wherein each projection plate is arranged for projection through one of the second end wall slots upon directing an associated link guidingly along an associated top wall slot.

1 Claim, 4 Drawing Sheets

REMOTE CONTROL PACIFIER NOVELTY DEVICE

BACKGROUND OF THE INVENTION

1. Field of the Invention

The field of invention relates to pacifier structure, and more particularly pertains to a new and improved remote control pacifier novelty device wherein the same is arranged to effect soothing and engagement of an individual to employ the novelty device of the invention when a further party employs an operative remote control unit.

2. Description of the Prior Art

Typically in operation of various electronic units such as television sets, stereos, and the like, the advent of the remote control has effected the dual social configuration of one individual employing an operative novelty device with a further individual having no control over such electronic units. The instant invention attempts to address the psychological needs of individuals by providing for a remote control pacifier novelty device addressed to the soothing manipulation of a simulated remote control organization. While remote control devices of various types are utilized throughout the prior art and exemplified by the U.S. Pat. Nos. 4,916,446; 4,959,810; and 4,897,883, the prior art has heretofore failed to set forth a remote control simulator for manipulation by individuals and in this respect, the present invention substantially fulfills this need.

SUMMARY OF THE INVENTION

In view of the foregoing disadvantages inherent in the known types of novelty device structure now present in the prior art, the present invention provides a remote control pacifier novelty device wherein the same is arranged to simulate remote control operation of an electronic unit. As such, the general purpose of the present invention, which will be described subsequently in greater detail, is to provide a new and improved remote control pacifier novelty device which has all the advantages of the prior art novelty apparatus and none of the disadvantages.

To attain this, the present invention provides a novelty device to simulate use of a remote control unit, with a housing having side walls, a first end wall spaced from a second end wall, and a top wall. A plurality of end wall slots arranged in a parallel relationship are directed through the second end wall, with the top wall having a like number of top wall slots, where each top wall slot includes an associated projection in mechanical relationship to a drive link and projection plate, wherein each projection plate is arranged for projection through one of the second end wall slots upon directing an associated link guidingly along an associated top wall slot.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved remote control pacifier novelty device which has all the advantages of the prior art novelty apparatus and none of the disadvantages.

It is another object of the present invention to provide a new and improved remote control pacifier novelty device which may be easily and efficiently manufactured and marketed.

It is a further object of the present invention to provide a new and improved remote control pacifier novelty device which is of a durable and reliable construction.

An even further object of the present invention is to provide a new and improved remote control pacifier novelty device which is susceptible of a low cost of manufacture with regard to both materials and labor, and which accordingly is then susceptible of low prices of sale to the consuming public, thereby making such remote control pacifier novelty device economically available to the buying public.

Still yet another object of the present invention is to provide a new and improved remote control pacifier novelty device which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
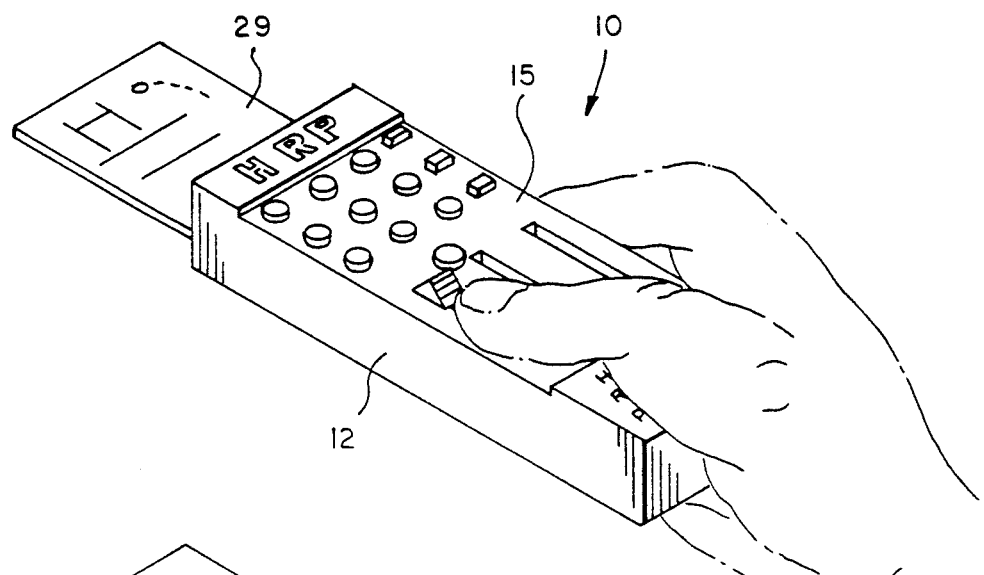
FIG. 1 is an isometric illustration of the instant invention.
Figure 2:
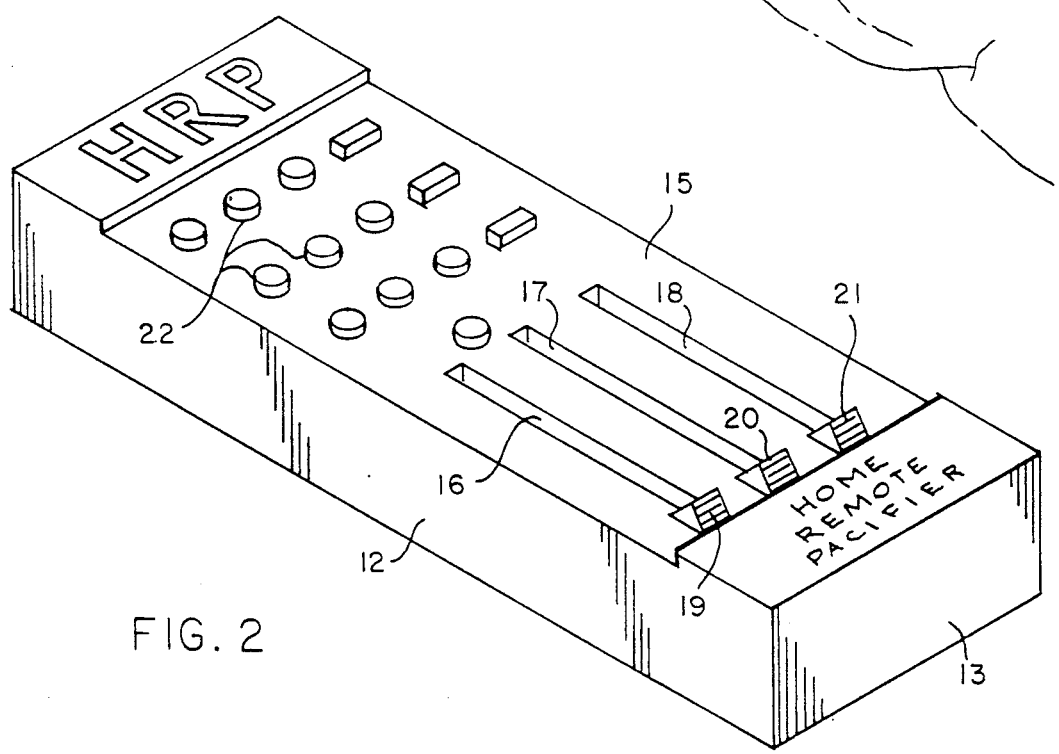
FIG. 2 is an enlarged isometric illustration of the invention.
Figure 4:
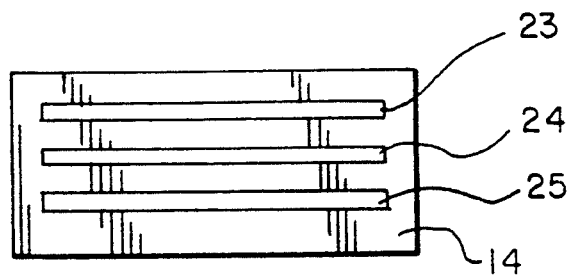
FIG. 4 is an orthographic end view of the invention.
Figure 3:
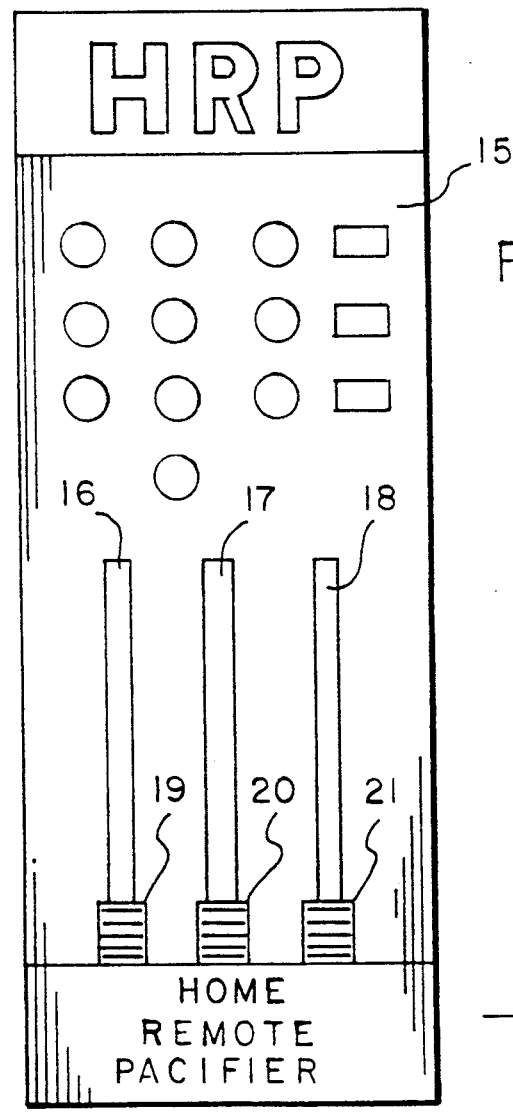
FIG. 3 is an orthographic top view of the invention.
Figure 5:
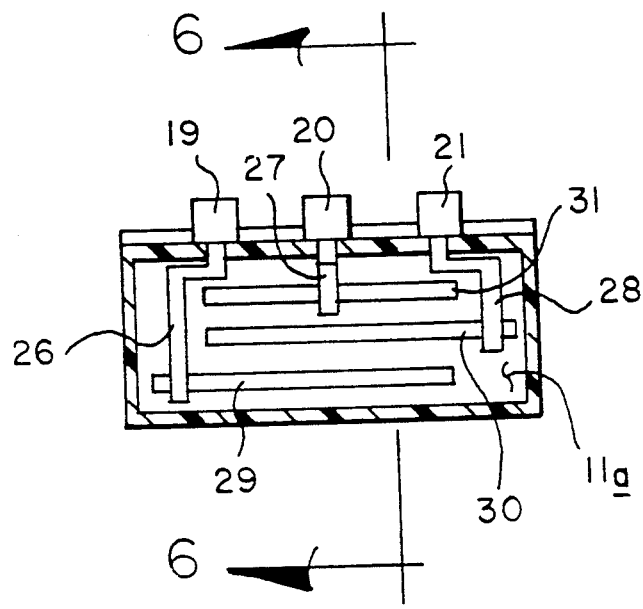
FIG. 5 is an orthographic view, taken along the lines 5—5 of FIG. 3 in the direction indicated by the arrows.

With reference now to the drawings, and in particular to FIGS. 1 to 8 thereof, a new and improved remote control pacifier novelty device embodying the principles and concepts of the present invention and generally designated by the reference numeral 10 will be described.

More specifically, the remote control pacifier novelty device 10 of the instant invention essentially comprises a housing 11 defining a housing cavity 11a within spaced side walls 12, a first end wall 13 spaced from a second end wall 14, and a top wall 15 spaced from a bottom wall. The top wall 15 includes a plurality of parallel coextensive slots to include a first slot 16, a second slot 17, and a third slot 18. The particular number of slots utilized is dictated by the configuration of the housing cavity 11a and the geometric sizing of the wall structure of the housing 11. Each of the parallel top wall slots includes a slide projection to include a first slide projection 19, a second slide projection 20, and a third slide projection 21 within respective first, second, and third slots 16, 17, and 18. A matrix of button projections 22 project upwardly of the top wall 15 between the second end wall 14 and the top wall slots to simulate a remote control organization for the pacifying effect upon individuals, that the individuals in fact manipulating a remote control type structure.

The second end wall includes a second end wall first, second, and third slot 23, 24, and 25 associated with the respective first, second, and third top wall slots 16, 17, and 18. The first slide projection 19 mounts a first projection link 26 that in turn is fixedly secured to a first pictorial plate 29. Similarly, the second and third projections 20 and 21 include respective second and third projection links 27 and 28 orthogonally mounted to second and third pictorial plates 30 and 31. The pictorial plates 29, 30, and 31 are oriented parallel to the top wall 15 positioned within the housing cavity 11a and are orthogonally oriented relative to the slide projections 19, 20, and 21. In this manner, forward projection of a slide projection effects the associated projection of a pictorial plate through its respective end wall slot. In this manner, various pictorial laminations of various types may be positioned to a top surface of each pictorial plate to provide for visual association of manipulation of a slide projection and its associated visual effect for the soothing of an individual in pacifying and the manipulation of the novelty device 10.

Figure 6:
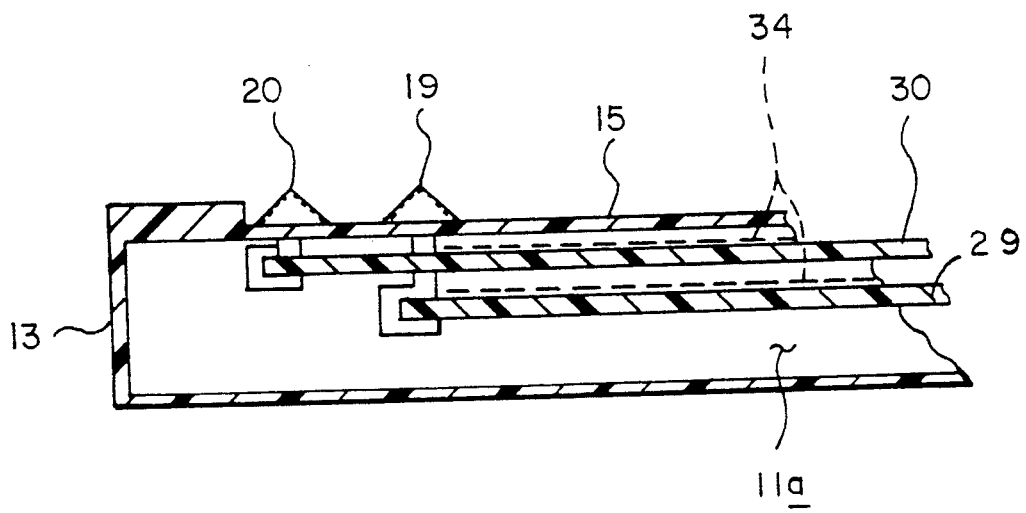
FIG. 6 is an orthographic view, taken along the lines 6—6 of FIG. 5 in the direction indicated by the arrows.

FIG. 6 notes the mounting of a pictorial layer 34 on the associated pictorial plates as representative of positioning of such pictorial laminations relative to the pictorial plates. In this manner, the pictorial laminations may be changed as desired by an individual.

Figure 7:
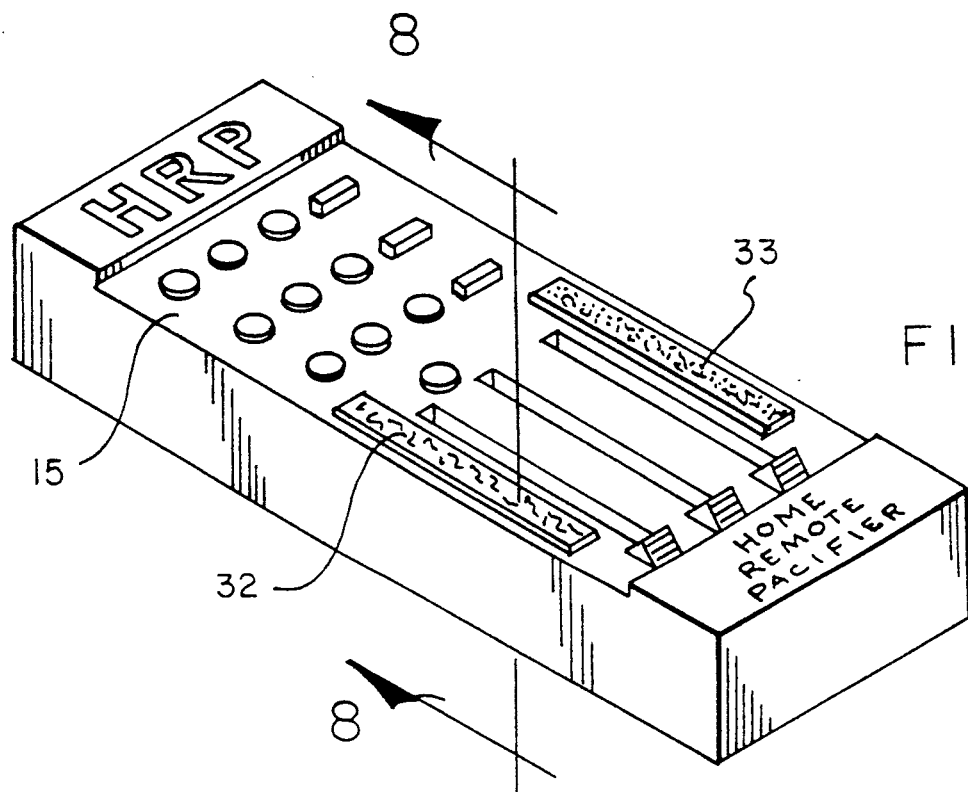
FIG. 7 is an isometric illustration of the device utilizing a sponge and abrasive plate structure for use by individuals.
Figure 8:
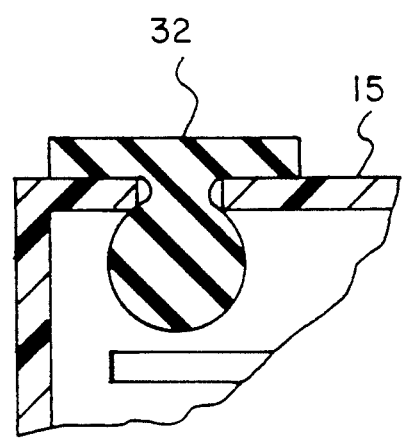
FIG. 8 is an orthographic view, taken along the lines 8—8 of FIG. 7 in the direction indicated by the arrows.

FIGS. 7 and 8 indicate the organization to further employ a sponge plate 32 to contain a saturated lotion therewithin for the soothing of an individual's fingers, as well as an abrasive plate 33, with the plates 32 and 33 positioned to the top wall adjacent a respective side wall. The abrasive plate is arranged to stimulate the individual's finger tips with the sponge plate 32 oriented to provide for a healing and soothing effect to the individual's fingers while employing the device of the instant invention.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restored to, falling within the scope of the invention.

What is claimed as being new and desired to be protected by Letters Patent of the United States is as follows:

1. A remote control pacifier novelty device, comprising, a housing, the housing having spaced side walls, a first end wall, a second end wall spaced from the first end wall, a top wall, the top wall positioned above and in cooperation with a bottom wall, with the housing defining a housing cavity within the housing, and the top wall including a plurality of top wall slots, wherein the top wall slots are oriented in a parallel relationship between the side walls and orthogonally between the first end wall and the second end wall positioned in adjacency relative to the first end wall, with the top wall slots including a first slot and a second slot, and the first slot and the second slot including a respective first slide projection and a second slide projection projecting exteriorly and above the housing top wall, with the first slide projection mounted within the first slot, and the second slide projection mounted within the second slot, and the second end wall including a plurality of second end wall slots, wherein the second end wall slots include a second end wall first slot and a second end wall second slot, wherein a first pictorial plate is slidably mounted within the first end wall slot, and a second pictorial plate is slidably mounted within the second end wall second slot, and first linkage means mounting the first slide projection to the first pictorial plate, and second linkage means mounting the second slide projection to the second pictorial plate, wherein the first linkage means and the second linkage means are arranged for fixed securement of the first slide projection to the first pictorial plate, and the second slide projection to the second pictorial plate respectively, and the first linkage means includes a first projection link orthogonally and fixedly mounted to the first pictorial plate and fixedly secured to the first slide projection, and the second linkage means includes a second projection link orthogonally and fixedly secured to the second pictorial plate and mounted to the second slide projection, and each pictorial plate includes a removable pictorial layer mounted to each respective pictorial plate, and the top wall includes a sponge plate, the sponge plate mounted in adjacency to the top wall slots adjacent one of said side walls, and the sponge plate includes a fluid lotion contained therewithin, and an abrasive plate mounted to a further of said side walls in adjacency to the top wall slots, wherein the abrasive plate is fixedly mounted to the top wall spaced from the sponge plate.

* * * * *